July 11, 1933.  J. V. KINDL  1,917,983
GAS VALVE
Filed May 10, 1932    2 Sheets-Sheet 1

INVENTOR
JOSEPH V. KINDL
BY
Fisher, Mosen & Moore
ATTORNEY

July 11, 1933.  J. V. KINDL  1,917,983
GAS VALVE
Filed May 10 1932  2 Sheets-Sheet 2
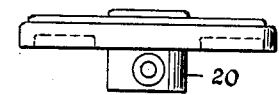
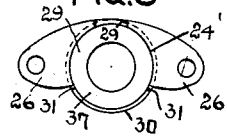
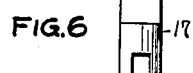
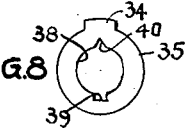
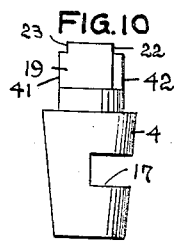
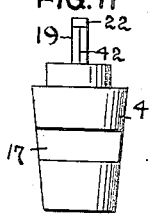
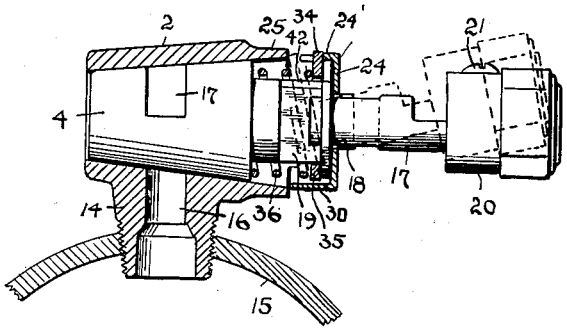
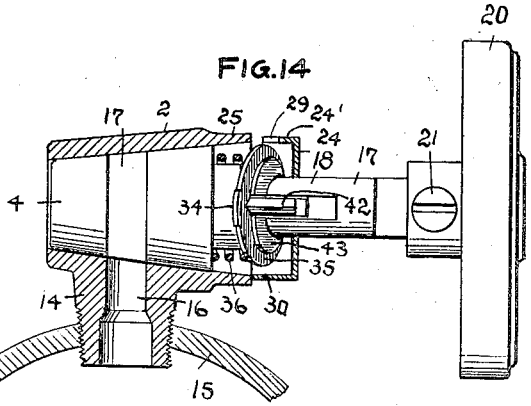
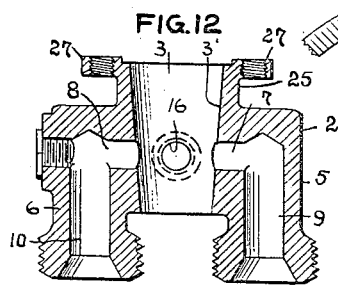
INVENTOR
JOSEPH V. KINDL
BY
Fisher, Moses & Moses
ATTORNEY Patented July 11, 1933

1,917,983

UNITED STATES PATENT OFFICE

JOSEPH V. KINDL, OF CLEVELAND, OHIO, ASSIGNOR TO THE W. J. SCHOENBERGER COMPANY, OF CLEVELAND, OHIO, A CORPORATION OF OHIO

GAS VALVE

Application filed May 10, 1932. Serial No. 610,370.

My invention relates in general to improvements in gas valves of the so called cock valve type and with respect to its more specific features to self-locking gas valves of this type adapted to prevent accidental and negligent operation with consequent danger to life and property from escaping gas. These gas valves ordinarily embody a spring pressed cone-shaped cock so housed in a common chamber that access may be easily gained to the cock for repairing and reseating purposes. The primary object of the present invention is to provide a valve of the character specified, with stop and locking means for locking the cock of the valve against rotation, and in which the stop and locking means are resiliently and tiltably seated by the spring means which yieldingly forces the cock upon its seat.

Another object of the invention is the provision of a valve of the type described having a non-rotatable cover member, and locking means slidably and tiltably interengaged with said cock and shaped to interlock with said cover member.

Still another object of the invention is the provision of a valve of the type described wherein the tiltable and slidable locking means serve to limit the rotation of the cock and automatically lock said cock in closed position, and in which tilting of such means is necessary before the cock may be rotated to its open position. With these and other objects in view the invention consists in the construction and novel combination of parts hereinafter more fully set forth, pointed out in the claims and shown in the accompanying drawings in which:

Figure 1:
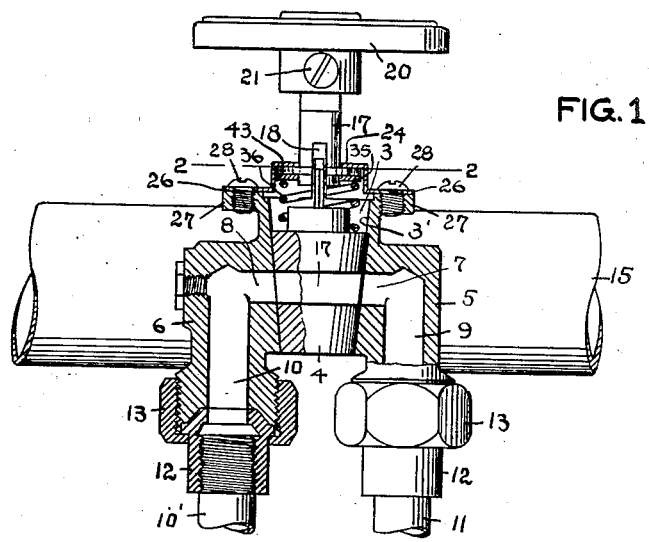
Figure 1 is a fragmentary sectional view of a two way valve embodying the features of the invention.
Figure 2:
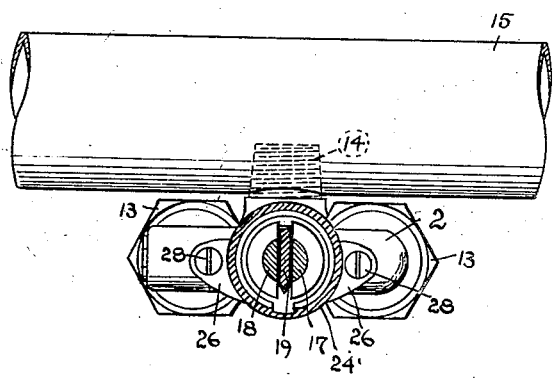
Figure 2 is a sectional view taken on line 2—2 of Figure 1.

Figures 3 through 12 show the various parts of the valve. Thus, Figure 3 is a side elevation of the handle, and Figures 4 and 5 are side and bottom elevations of the cover member for securing the valve stem to the valve body. Figure 6 is a side elevation of the operating stem. Figures 7 and 8 are side and bottom elevations of the lock washer. Figure 9 is a side elevation of the spring seating the valve and lock washer. Figures 10 and 11 are side elevations of the rotatable valve and Figure 12 is a longitudinal sectional view through the valve body;

Figure 13 is a longitudinal sectional view through the assembled valve when closed, and showing in full lines the handle in locked position and in dotted lines the handle tilted to unlock the same; and Figure 14 is a longitudinal sectional view similar to Figure 13 with the valve rotated to open position.

To the exemplified form of the invention shown in the drawings the U-shaped cast metal body 2 of the two-way valve is centrally cored or chambered, as at 3 to provide a cone-shaped seat 3' for a plug valve 4 rotatably mounted therein. The branches 5 and 6 of body 2 communicate with chamber 3 through drilled passages 7, 8, 9 and 10 respectively, and the outer ends of such branches are externally screw-threaded for standard connection with flanged nipples 12 of gas pipes 10' and 11, flanged nuts 13 being employed for rigidly holding nipples 12 in place. Body 2 includes a hollow laterally extending branch or nipple 14 arranged in a plane substantially at right angles to the plane of branches 5—6, which nipple is externally threaded at its outer end for convenient attachment to the manifold 15 of a range or gas stove, not shown. Nipple 14 communicates through passage 16, with valve chamber 3, and passage 16 is located in the plane of passages 7, 8 for communication therewith. A milled slot 17 in plug valve 4 may alternately be brought into alignment with passages 7, 8 and 16, by rotating the plug.

The valve thus described is an ordinary two way valve having two open positions and a neutral position in which the gas supply is entirely shut off. In operation plug valve 4 is manually rotated by means of a slotted valve stem 17 interengaging at its slotted lower end 18 with an upwardly projecting flat portion or extension 19 formed on the top of valve 4, the stem being provided with an operating handle 20 rigidly attached thereto by screw 21. Extension 19 extends through flanged cover member 24 seated upon the extended neck 25 of body 2 and is cut away or notched at its upper corner edges as at 22—23. The flange 24' of cover member 24 is formed with oppositely extending apertured ears 26 which seat upon laterally extending apertured lugs 27 on body 2 and are rigidly connected therewith by screws 28. One side of flange 24' is cut away at one side to form a narrow recess 29 and at the opposite side is formed with an arcuate depending portion or extension 30 which extends around approximately one fourth the periphery of the flange. Stop shoulders 31 are thus formed at opposite ends of the portion 30 which limit the rotation of plug valve 4, when the finger 34 of a lock washer 35, slidably but nonrotatably mounted upon extension 19 of valve 4, contacts therewith. When the finger 34 is forced into the narrow recess 29 by means of a compression spring 36 sleeved upon extension 19 and tending to force washer 35 upwardly against the cover member 24, the valve will be positively locked. It will be noted that the key way opening 38 in lock washer 35 is of a size to permit free sliding movement of the washer on the flat extension 19 of valve stem 17, and also to permit free engagement of the washer with the lower bifurcated or slotted end 18 of the valve stem, spreading of the latter being thus effectually prevented. The opening 38 is of oblong shape, preferably oval, and formed with oppositely arranged cut out portions 39 and 40, axially aligned with the longer axis of the opening to facilitate assembly and prevent relative rotation of the valve stem and washer. Cut out portion 39 is of rectangular shape and cut out portion 40 of triangular shape to snugly receive the correspondingly shaped edges 41 and 42 of flat portion or extension 19 of valve 4. The lower slotted portion of stem 17 is provided with a collar 43, which forms a seat for washer 35, and which also engages the inner face of top 37 of member 24, thus limiting upward movement of the stem.

When valve plug 4 is seated to close supply passage 16 from communication with passages 7 and 8, washer 35 yieldingly engages in narrow recess 29 of cover member 24, see Figure 13, to release the finger 34 of the washer, and when stem 17 is tilted upwardly until said finger is entirely drawn out of recess 29 and the stem is given a slight turn, finger 34 will seat upon and ride over the edge of flange 24' of the cover member 24. In this position when washer 35 is tilted, see Figures 13 and 14, the valve stem 17 and valve 4 may be freely rotated to make the desired connection between the main feed line and pipe lines 10' and 11 respectively.

Turning of stem 17 and valve 4 in opposite directions to neutral position brings finger 34 of washer 35 into alignment with recess 29, so that spring 36 will force the finger into said recess and thus prevent further rotation of the valve. Consequently, it will be seen that it is impossible to rotate the valve beyond its neutral position unless the valve stem is tilted.

The tiltable locking mechanism illustrated herein may be readily applied to one way valves, for locking same against rotation when in off position. The arrangement may also be used for downward tilting movement of the handles by inverting the position of the valve.

What I claim is:

1. A valve, comprising a valve body having a valve seat and a hollow extension aligned with said seat, a valve plug rotatably confined within said seat, a shaft tiltably and non-rotatably interengaged with said valve plug, locking means slidably and non-rotatably interlocked with said valve plug and shaft for locking said valve plug and shaft against rotation, cover means non-rotatably attached to said hollow extension, a cut out portion in said cover means cooperating with said locking means and yielding means between said valve plug and said locking means for forcing said locking means toward said cover means away from said valve plug, said locking means being disengageable from the cut out portion of said cover means by tilting of said shaft.

2. A valve, comprising a valve body having a valve seat, a hollow extension on said body aligned with said seat having ear portions, a valve plug rotatably confined within said seat, a shaft tiltably and non-rotatably interengaged with said valve plug, locking means slidably and non-rotatably interengaged with said valve plug and shaft for locking said valve plug and shaft against rotation when said valve is closed, a hollow cover member for said hollow extension having means for rigidly securing said cover member to the ears of said extension, a recess in the side wall of said cover member adapted to cooperate with said locking means and a relatively stiff spring between said valve plug and locking means tending to force said locking means toward said cover means away from said valve plug, said locking means being disengageable from the recess in the side wall of said cover member by tilting of said shaft.

3. A valve comprising a valve body, a rotatable valve plug within said body, a shaft for operating said valve plug tiltably and non-rotatably interlocked therewith, means slidably and non-rotatably interlocked with said valve plug and shaft for automatically locking said shaft and valve plug against rotation when said valve plug is in neutral position, a hollow cover member non-rotatably secured to said valve body in axial alignment with said valve plug, a recess in the side wall of said cover member cooperating with said locking means and a relatively stiff compression spring for forcing said locking means into said recess of said cover member and away from said valve plug.

4. A valve comprising a valve body having a valve seat and a hollow extension axially aligned with said seat, a valve plug rotatably confined within said seat having a flat sided extension of irregular cross section, a shaft having one end slotted and flanged, said shaft engaging said flat sided extension with its slotted end, a locking washer perforated to fit said flat sided extension in one position only and provided with a laterally extending finger portion, said washer being tiltably and non-rotatably interengaged with said flat sided extension of said valve plug, a cover member non-rotatably secured to said extension, means on said cover member cooperating with said locking means in locking said valve plug against rotation and a relatively stiff compression spring seated between said rotatable valve plug and said locking washer for forcing said valve plug upon its seat and said washer away from said plug toward said cover member and the locking means thereof.

5. A valve comprising a valve body having a valve seat and a hollow extension aligned with said seat, a hollow cover member non-rotatably secured to said hollow extension, a recess in the side wall of said cover member extension, a valve plug rotatably confined within said seat having a flat sided extension, a washer tiltably and non-rotatably coupled with said valve plug, said washer including a finger portion for engagement with the recess of said hollow extension, an operating stem tiltably and non-rotatably coupled with said flat sided extension of said valve plug, and relatively stiff spring means seated between said valve plug and said washer for forcing said valve plug upon its seat and said washer against said cover member away from said valve plug.

6. A valve comprising a valve body having a valve seat and a hollow extension aligned with said seat, lateral ear portions on said extension above the upper edge thereof, a hollow cover member having at its lower edge laterally extending flanges seated upon and attached to said ear portions to space said cover member axially from said hollow extension, and form a slot between said members, an integral extension on a portion of the side wall of said cover member to limit the length of said slot, a recess in the side wall of said cover member, a rotatable valve plug within said valve body, an operating shaft tiltably engaged with said valve plug, a washer tiltably and non-rotatably coupled with said valve including a laterally extended finger portion adapted to extend into said slot and to engage said recess, and relatively stiff spring means arranged between said valve plug and said washer for forcing said valve plug upon its seat and said washer against said cover member away from said valve plug.

In testimony whereof I affix my signature.

JOSEPH V. KINDL.